(12) United States Patent
Pireyre et al.

(10) Patent No.: US 10,337,740 B2
(45) Date of Patent: Jul. 2, 2019

(54) ANNULAR COMBUSTION CHAMBER IN A TURBINE ENGINE

(71) Applicant: Snecma, Paris (FR)

(72) Inventors: Pierre-François Simon Paul Pireyre, Moissy Cramayel (FR); Brice Le Pannerer, Moissy Cramayel (FR); Laurent Bernard Cameriano, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 212 days.

(21) Appl. No.: 15/105,696

(22) PCT Filed: Dec. 8, 2014

(86) PCT No.: PCT/FR2014/053207
§ 371 (c)(1),
(2) Date: Jun. 17, 2016

(87) PCT Pub. No.: WO2015/092206
PCT Pub. Date: Jun. 25, 2015

(65) Prior Publication Data
US 2017/0003028 A1    Jan. 5, 2017

(30) Foreign Application Priority Data
Dec. 20, 2013 (FR) ...................... 13 63341

(51) Int. Cl.
*F02K 3/04* (2006.01)
*F23R 3/28* (2006.01)
(Continued)

(52) U.S. Cl.
CPC ................ *F23R 3/283* (2013.01); *F02K 3/04* (2013.01); *F16B 21/02* (2013.01); *F16B 21/04* (2013.01);
(Continued)

(58) Field of Classification Search
CPC .... F23R 3/22; F23R 3/283; F23R 3/60; F23R 2900/00018; F23R 2900/00017;
(Continued)

(56) References Cited

U.S. PATENT DOCUMENTS 5,996,335 A    12/1999  Ebel
6,003,724 A *  12/1999  Collins .................. A47F 1/065
                                                    221/154
(Continued)

FOREIGN PATENT DOCUMENTS

FR           2 679 010 A1    1/1993

*Primary Examiner* — Todd E Manahan
*Assistant Examiner* — Thuyhang Nguyen
(74) *Attorney, Agent, or Firm* — Blank Rome LLP

(57) ABSTRACT

The invention relates to a device for supporting and centring a fuel injector in a turbine engine combustion chamber, which includes means for centring a fuel injector along an axis, which are movable in a plane that is radial to the centring axis (52) in supporting means intended for being attached to the bottom of an annular chamber (18). According to the invention, the centring means include at least two radially external tabs (54, 56) each inserted respectively in a circumferential recess (60, 64) of the supporting means, the device including circumferential abutment means (78, 80, 74, 76, 82, 86, 84, 88) of the radial tabs (54, 56) of the centring means in the circumferential recesses (60, 64), the circumferential abutment means being configured such as to enable a greater angular displacement of a first (54, 154) one of the radial tabs in a first circumferential recess (60) relative to a second (56, 156) one of the radial tabs in a second circumferential recess (64).

12 Claims, 3 Drawing Sheets

(51) Int. Cl.
   *F23R 3/22* (2006.01)
   *F23R 3/60* (2006.01)
   *F16B 21/02* (2006.01)
   *F16B 21/04* (2006.01)

(52) U.S. Cl.
   CPC ............... *F23R 3/22* (2013.01); *F23R 3/60* (2013.01); *F23R 2900/00017* (2013.01); *F23R 2900/00018* (2013.01); *Y10T 403/7005* (2015.01); *Y10T 403/7007* (2015.01)

(58) Field of Classification Search
   CPC .. F02C 7/20; F05D 2240/35; Y10T 403/7007; Y10T 403/7005; F16B 21/02; F16B 21/04
   See application file for complete search history.

(56) References Cited

U.S. PATENT DOCUMENTS

| | | | |
|---|---|---|---|
| 7,415,826 B2* | 8/2008 | McMasters | F23R 3/286 |
| | | | 60/748 |
| 8,291,706 B2* | 10/2012 | Tanner | F23C 5/02 |
| | | | 239/587.1 |
| 2012/0198653 A1 | 8/2012 | Tanner et al. | |

* cited by examiner

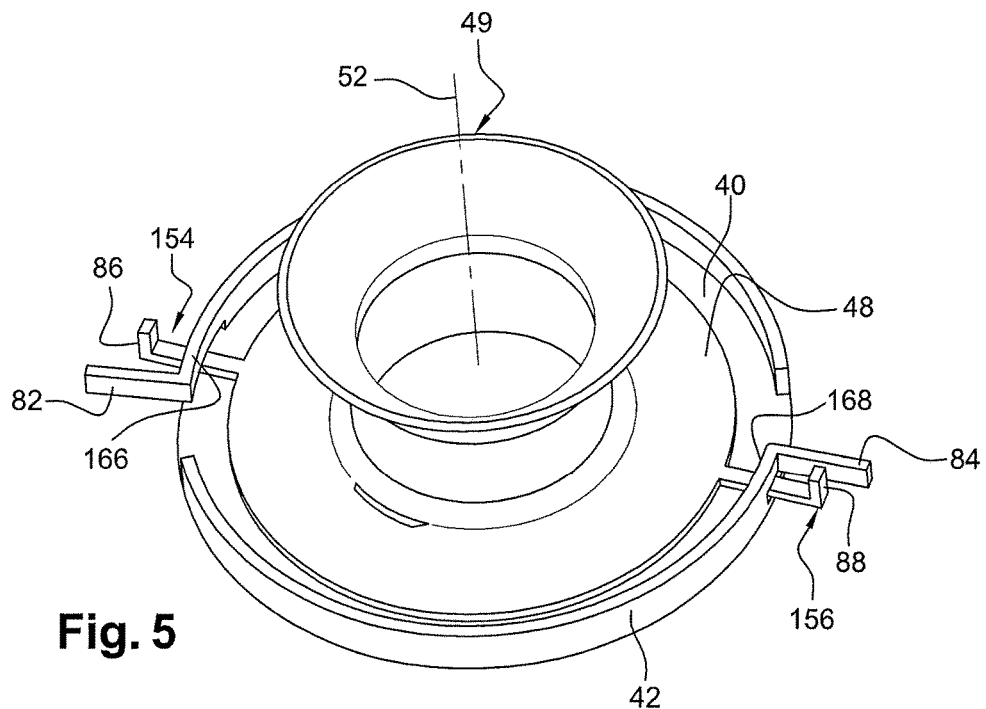
Fig. 5
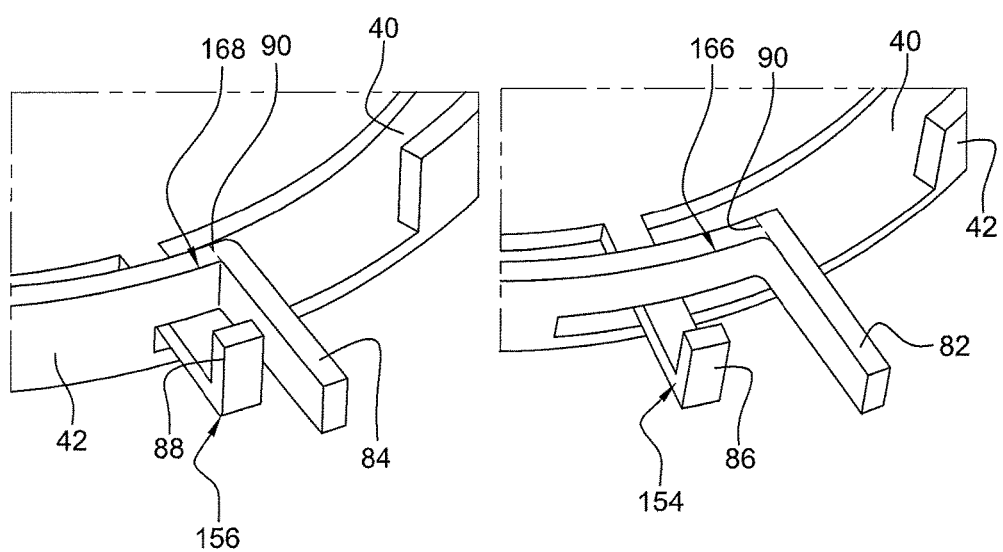
Fig. 6A  Fig. 6B

ANNULAR COMBUSTION CHAMBER IN A TURBINE ENGINE

The present invention relates to a turbine engine annular combustion chamber, in addition to a turbine engine equipped with an annular combustion chamber.

In a manner known per se, an annular combustion chamber comprises two internal and external coaxial revolution surfaces, connected to one another upstream by a so-called back of chamber annular wall featuring through apertures for fuel injector heads between the internal and external revolution surfaces. Each injector is inserted in means of centring, which are movable in the radial direction in supporting means interdependent with supporting means.

In the current technology, the means of centring of each injector are formed by a centring ring into which an injector is inserted and comprising a radial annular collar extending radially outwards and slidably mounted in an annular groove of the supporting means.

The annular groove of the supporting means allows radial and circumferential displacement of the centring ring which houses the injector in order to compensate for the manufacturing tolerances that may result in misalignments of the injector with the fuel injection axis between the internal and external walls of the combustion chamber. It also makes it possible to compensate for the differential expansions during operation between the injector and the chamber.

The free displacement in rotation and in radial translation of the means of centring in the annular groove of the supporting means may however result in substantial wear of the collar of the means of centring, thus requiring its replacement during maintenance. Furthermore, during operation, it is also important to guarantee the reliability of the means of centring, which ensure proper positioning of the injector and therefore correct functioning of the combustion chamber.

The aim of the invention is in particular to provide a simple, effective and economical solution to the problems of the previously described prior art.

To this end, it proposes a device for supporting and centring a fuel injector in a turbine engine combustion chamber, which includes means for centring a fuel injector along an axis, which are movable in a plane that is radial to the centring axis in supporting means intended for being attached to the bottom of an annular chamber, characterised in that the means of centring include at least two radially external tabs, each inserted respectively in a circumferential recess of the supporting means, wherein the device includes circumferential abutment means of the radial tabs of the means of centring in the circumferential recesses, wherein the circumferential abutment means are configured such as to enable a greater angular displacement of a first one of the radial tabs in a first circumferential recess relative to a second one of the radial tabs in a second circumferential recess.

According to the invention, the means of centring are capable of sliding freely in the radial direction in the support means and include at least two radial tabs slidably inserted respectively in first and second circumferential recesses of the supporting means. Limiting the angular displacement of the second one of the radial tabs in a second recess in relation to another first one of the tabs makes it possible to reduce wear of one of the tabs during operation due to friction against the means of support. It also above all allows a reduction in wear of the interface between the injector head and the ring of the means of centring in which the injector is accommodated.

According to another characteristic of the invention, the supporting means include an annular edge extending along the centring axis, in which the first and second circumferential recesses accommodating the first and second radial tabs of the means of centring are arranged.

Preferentially, the first and second circumferential recesses of the annular edge each open out respectively at an end in a first and a second axial recess extending along the centring axis and opening out at an end of the annular edge.

With such an assembly, the radial tabs of the means of centring thus form first means of bayonet fixing interacting with second means of bayonet fixing mounted on the supporting means and formed by the first and second axial recesses and the first and second circumferential recesses.

According to another further characteristic of the invention, the first and second axial recesses and the first and second circumferential recesses form axial and circumferential apertures or openings, respectively, of the annular edge through which the first and second radial tabs radially pass and delimit a respective first and second circumferential tongue of the annular edge.

The circumferential abutment means in a first direction of rotation of each of the first and second radial tabs around the centring axis are advantageously formed by a respective axial and radial face delimiting a circumferential end of the first and second circumferential openings.

In a first embodiment of the invention, the circumferential abutment means of each of the first and second radial tabs in a second direction of rotation contrary to the first direction of rotation are formed by an axial and radial face of a first and a second tooth in axial protrusion in the first and second circumferential openings, respectively, wherein each face of the first and second teeth are oriented circumferentially in the opposite direction to said first opening.

Preferentially, the axial dimension of the circumferential opening measured at the axial and radial wall of the first and second teeth is less than the axial dimension of the radial tab.

In a second practical embodiment of the invention, the circumferential abutment means of each of the first and second radial tabs in a second direction of rotation contrary to the first direction of rotation are formed by the free end portion of each of the first and second tongue, which is bent radially outwards in order to serve as a circumferential abutment to the bent free end of the first and second radial tab.

Advantageously, the device comprises solely a first and a second radial tab inserted diametrically opposed to one another and respectively inserted in a first and a second circumferential recess of the supporting means.

According to another characteristic of the invention, the means of centring include first means of bayonet fixing interacting with second means of bayonet fixing mounted on the supporting means for axial securing of the means of centring on the supporting means.

The invention also relates to an annular combustion chamber in a turbine engine, including at least one device as above.

The invention also relates to a turbine engine, such as a turbofan or a turboprop, including a combustion chamber as above.

The invention will be better understood and other details, characteristics and advantages thereof will become apparent in reading the following description, given by way of a non-restrictive example with reference to the appended drawings in which:

FIG. 5 is a perspective diagrammatic view of a device for supporting and centring an injector according to a second embodiment;

FIGS. 6A and 6B are perspective diagrammatic views of the angular displacement of the means of centring in FIG. 5.

Figure 1:
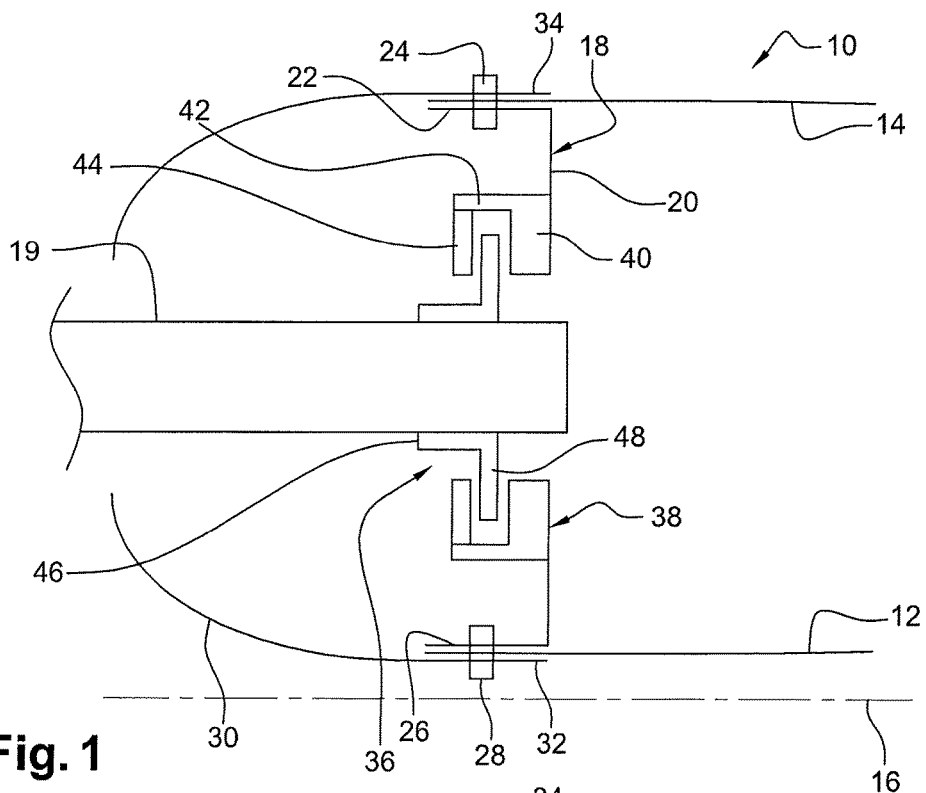
FIG. 1 is a cross-sectional axial diagrammatic view of the upstream portion of a combustion chamber according to the prior art.

Reference will be made initially to FIG. 1, which represents the upstream portion of a combustion chamber 10 in a turbine engine according to the known technology comprising two internal 12 and external 14 revolution surfaces extending around the axis 16 of the combustion chamber and secured at their upstream ends to an annular chamber bottom 18 extending between the internal 12 and external 14 revolution surfaces and through which fuel injectors 19 pass. The annular chamber bottom 18 comprises a radial annular wall 20, the outer circumference of which is connected to an external cylindrical edge 22 extending in the upstream direction and fixed by bolting elements 24 to the upstream end of the external revolution surface 14. The inner circumference of the radial surface 20 of the annular chamber bottom 18 is connected to an internal cylindrical edge 26 extending in the upstream direction and fixed by bolting elements 28 to the upstream end of the internal revolution surface 12.

An annular fairing 30, shaped with a concave curvature in the downstream direction along a cut plane including the axis 16 of the combustion chamber 10, also the fuel injectors 19 passing through it and its downstream radially internal 32 and external 34 ends are fixed by bolting to the internal 26 and external 22 cylindrical edges of the chamber bottom 18 and to the upstream ends of the internal 12 and external 14 revolution surfaces. The upstream end of the external revolution surface 14 is arranged radially between the external downstream end 34 of the fairing 30 and the external cylindrical edge 22 of the annular chamber bottom 18. The upstream end of the internal revolution surface 12 is arranged radially between the internal downstream end 32 of the fairing 30 and the internal cylindrical edge 26 of the annular chamber bottom 18.

The annular chamber bottom 18 comprises several through apertures for the injector heads 19 for spraying fuel between the internal 12 and external 14 revolution surfaces in addition to downstream from the chamber bottom 18.

Each injector 19 is inserted axially in means of centring 36 of the injector 19, wherein said means of centring 36 are movable in the radial and circumferential direction in supporting means 38 interdependent with the annular chamber bottom 18.

The supporting means 38 of each injector 19 comprise a radial annular surface 40 fixed around the aperture through which the injector passes and on the upstream face of the annular surface of the chamber bottom 18. The radially external end of the radial annular surface 40 is connected to a cylindrical edge 42 extending in the upstream direction.

For each injection system, a plate 44 or washer is fixed by welding or brazing its external circumference to the upstream end of the cylindrical edge 42 of the sheath (FIG. 1)

The means of centring of each injector 19 include a ring 46 through which the head passes axially and comprising an annular collar 48 at a downstream end extending radially outwards and radially slidably mounted in the groove delimited upstream by the washer 44 and downstream by the radial annular wall 40. The bottom of the groove is delimited by the cylindrical edge 42.

The weld beads of the axial retaining washers 44 of the means of centring in the upstream direction can be weakened and are therefore liable to break during operation, which affects fuel injection between the internal 12 and external 14 revolution surfaces.

Furthermore, as explained above, free mounting in rotation of the means of centring in the supporting means induces major friction between the annular collar and the cylindrical edge of the supporting means.

The invention solves these problems by achieving axial retention of the means of centring on the supporting means through radial tabs of the means of centring accommodated in circumferential openings in the supporting means and by restricting the angular displacement of one of the radial tabs in relation to the other one of the radial tabs.

Figure 2:
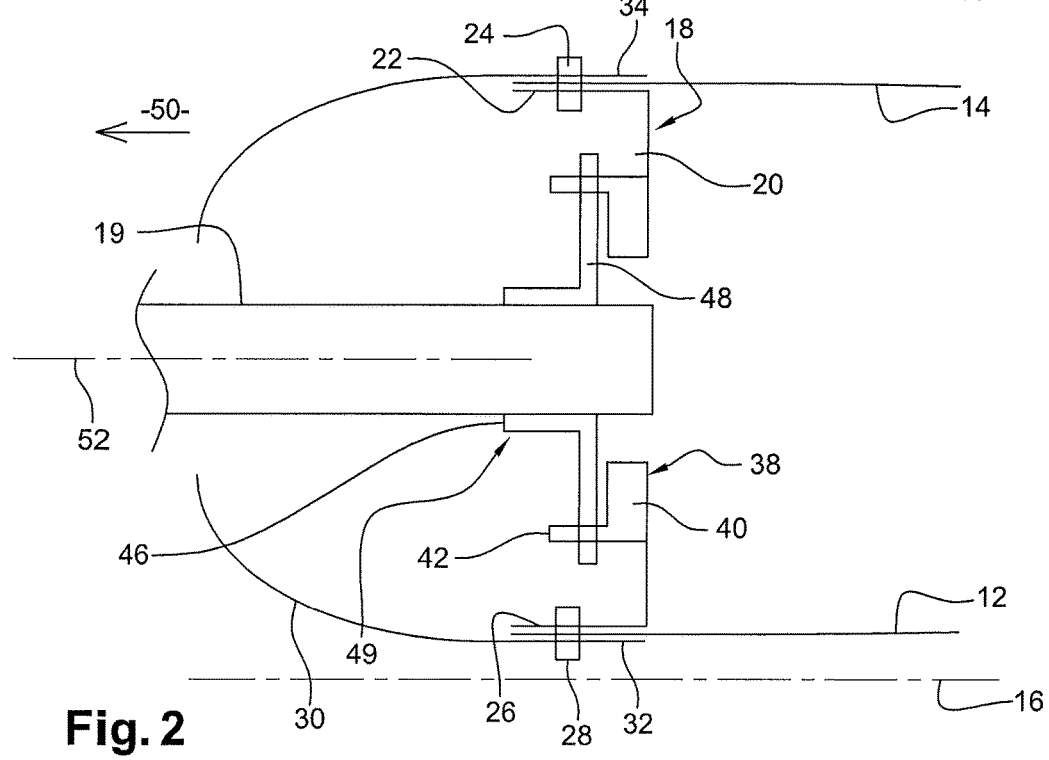
FIG. 2 is a cross-sectional axial diagrammatic view of the upstream portion of a combustion chamber according to the invention.
Figure 3:
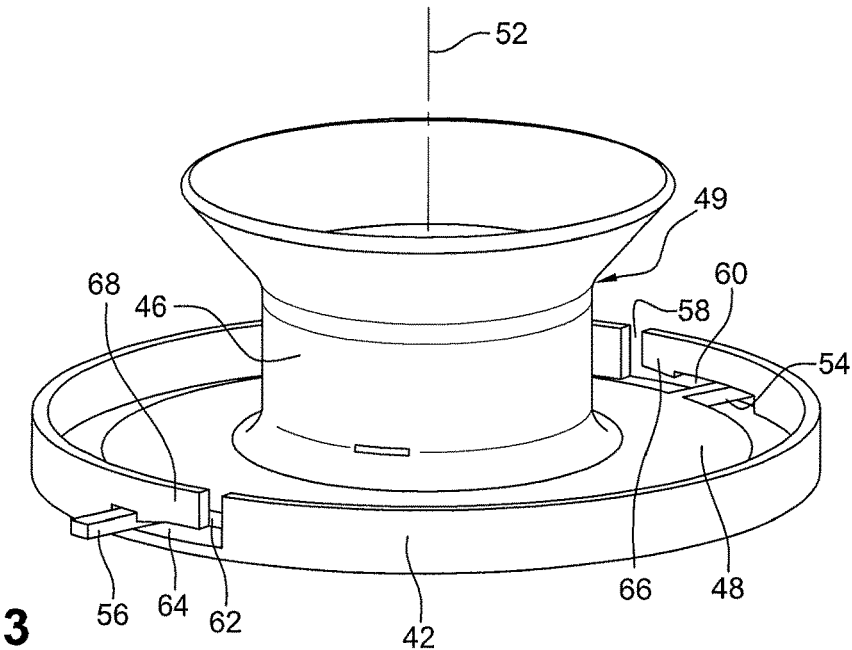
FIG. 3 is a perspective diagrammatic view of a device for supporting and centring an injector according to a first embodiment.

In the continuation of the description and as illustrated in FIG. 2, the first direction 50 in this case is oriented upstream in the direction formed by the axis of the means of centring 52 which is parallel to the axis 16 of the combustion chamber.

In order to achieve axial retention of the means of centring on the supporting means, the means of centring 48 include first means of bayonet fixing that interact with second means of bayonet fixing mounted on the supporting means 38.

The external circumference of the annular collar 48 thus bears a first 54 and a second 56 tab extending radially outwards. The first tab 54 and the second tab 56 are diametrically opposed to one another in relation to the centring axis 52 so as to be aligned in a straight line perpendicular to the centring axis 52 and passing through this axis 52.

The second means of bayonet fixing include apertures or openings formed in the thickness of the cylindrical edge 42. The cylindrical edge 42 thus comprises a first axial opening 58 opening out axially in the first direction, i.e. upstream, at the upstream end of the cylindrical edge 42 and axially in the second direction opposite to the first direction, i.e. downstream, in a first circumferential opening 60. Diametrically opposite the first axial opening 58 and the first circumferential opening 60, the cylindrical edge 42 comprises a second axial opening 62 and a second circumferential opening 64.

The first axial opening 58 and the first circumferential opening 60 thus forms an L-shaped cavity delimiting a first circumferential tongue 66 of the cylindrical edge 42. Likewise, the second axial opening 62 and the second circumferential opening 64 likewise form an L-shaped cavity delimiting a second circumferential tongue 68 of the cylindrical edge 42.

The radial tabs 54, 56 of the centring ring are radially dimensioned such that their free ends radially protrude outwards in relation to the cylindrical edge 42.

In practice, the centring ring is thus installed in the supporting means by aligning the first radial tab 54 with the first axial opening 58 and likewise the second radial tab 56 with the second axial opening 62. The centring ring is subsequently translated in the downstream direction and a rotational movement is applied to the latter so that the first radial tab 54 slides circumferentially in the first circumferential opening 60 and the second radial tab 56 slides circumferentially in the second circumferential opening 64.

Circumferential abutment means are provided in order to prevent circumferential disengagement of the first 54 and second 56 radial tabs of the first 60 and second 64 circumferential openings.

In a first embodiment, the abutment means of the first 54 and second 56 tabs comprise a first and a second tooth 70, 72 formed on the first 66 and second tongues and extending axially in the first 60 and second 64 circumferential openings. The first 70 and second 72 teeth each comprise an axial and radial face 74, 76 circumferentially opposite a radial and axial face 78, 80 delimiting the circumferential end of the circumferential opening 60, 64 which is circumferentially opposite the axial opening 58, 62.

Hence, the radial and axial walls 74, 76 of the teeth 70, 72 and the end faces 78, 80 of the circumferential openings 60, 64 form circumferential abutments maintaining each radial tab 54, 56 in its respective circumferential recess.

The axial dimension of each first 70 and second 72 tooth gradually increases in progressing away from the free end of each first 66 and second 68 tongue in order to form a circumferential sliding surface of the tabs 54, 56 on the teeth 70, 72. At each radial wall 74, 76, the axial space J1 between the tooth 70, 72 and the radial wall 40 of the supporting means is slightly less than the axial dimension J2 of each first 54 and second 56 tab. Thus, each first 54 and second 56 tab is installed by snapping in place between the circumferential abutment faces of the first and second circumferential openings.

Figure 4A:
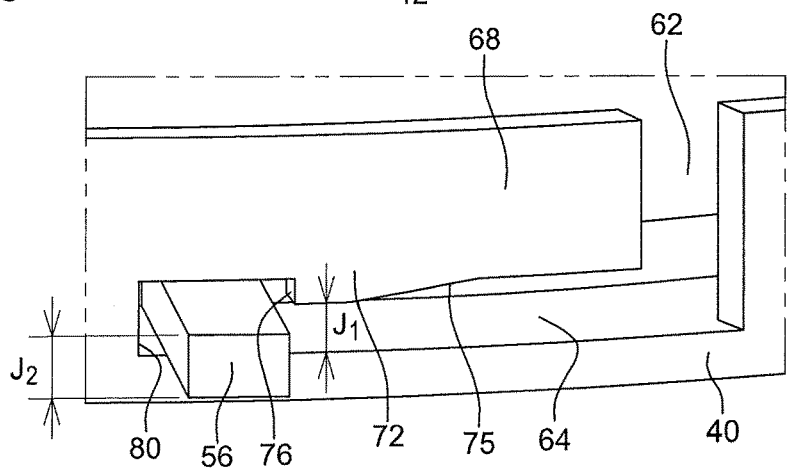
FIGS. 4A and 4B are perspective diagrammatic views of the angular displacement of the means of centring in FIG. 3.
Figure 4B:
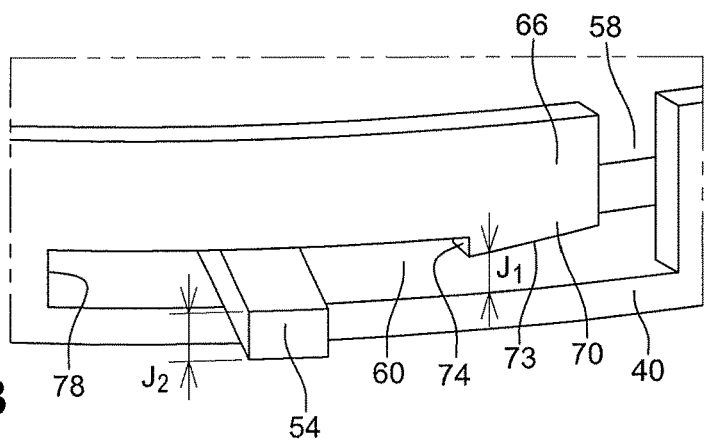

As shown in FIGS. 4A and 4B, the first tooth 70 is arranged at the free end of the first tongue 66 and the second tooth 72 is arranged at a distance roughly two thirds away from the free end of the second tongue 68. The angular displacement of the first radial tab 54 in the supporting means is thus greater than the angular displacement of the second radial tab 56 in the supporting means, which allows a reduction in the friction between one of the radial tabs and the supporting means and above all restriction of rotation of the centring ring around the axis 52 of the means of centring under the influence of the vibrations of the turbine engine, capable of prematurely wearing the interface between the centring ring and the injector head.

In a second embodiment of the invention illustrated in FIGS. 5, 6A and 6B, the teeth 70, 72 are replaced by edges 82, 84 extending radially outwards from the first 166 and second 168 tongues interacting with the corresponding edges 86, 88 of the first 154 and second 156 tabs extending in the first direction (upstream). It is understood that the edges 82, 84, 86, 88 of the radial tabs 154, 156 and of the circumferential tongues 166, 168 are formed by folding following bayonet fixing of the means of centring in the supporting means.

The different angular displacement between the first 154 and second 156 tabs in the supporting means is obtained by varying the circumferential positioning of the fold lines 90 on the circumferential tongues 168, 166.

In another possible embodiment of the invention, the free ends of the radial tabs interact by bayonet fixing with axial and circumferential recesses formed on the internal surface of the annular edge. Hence, the term "recess" used in the present patent application simultaneously covers grooves or cavities in the annular edge or openings as shown in the figures.

The purpose of this last paragraph is to define a variant not illustrated in the figures in which grooves or axial and circumferential recesses are formed on the internal surface of the annular edge.

The invention claimed is:

1. A device for supporting and centering a fuel injector in a turbine engine combustion chamber, comprising:
    means for centering a fuel injector along a centering axis, wherein the means for centering is movable in a plane that is radial to the centering axis, and
    supporting means intended for being attached to a bottom of an annular chamber,
    wherein the means of centering includes at least two radially external tabs, each inserted respectively in a circumferential recess of the supporting means,
    wherein each of the at least two radially external tabs is associated with a corresponding circumferential abutment means, and
    wherein the circumferential abutment means are configured to enable a greater angular displacement of a first one of the radially external tabs in a first circumferential recess relative to a second one of the radially external tabs in a second circumferential recess.

2. The device according to claim 1, wherein the supporting means include an annular edge extending along the centering axis, in which the first and second circumferential recesses accommodating the first and second radially external tabs are arranged.

3. The device according to claim 2, wherein the first and second circumferential recesses of the annular edge each open out respectively at an end in a first and a second axial recess extending along the centering axis and opening out at an end of the annular edge.

4. The device according to claim 3, wherein the first and second axial recesses and the first and second circumferential recesses form axial and circumferential openings, respectively, of the annular edge through which the first and second radially external tabs radially pass and delimit a respective first and second circumferential tongue of the annular edge.

5. The device according to claim 4, wherein the circumferential abutment means of each of the first and second radially external tabs in a second direction of rotation contrary to the first direction of rotation are formed by a free end portion of each of the first and second tongue, which is bent radially outwards in order to serve as a circumferential abutment to the bent free end of the first and second radial tab.

6. The device according to claim 1, wherein the circumferential abutment means in a first direction of rotation of each of the first and second radially external tabs around the centering axis are advantageously formed by a respective axial and radial face delimiting a circumferential end of first and second circumferential openings.

7. The device according to claim 6, wherein the circumferential abutment means of each of the first and second radially external tabs in a second direction of rotation contrary to the first direction of rotation are formed by an axial and radial face of a first and a second tooth in axial protrusion in the first and second circumferential openings, respectively, wherein each face of the first and second teeth are oriented circumferentially in the opposite direction to said first opening.

8. The device according to claim 7, wherein an axial dimension of the circumferential opening measured at the axial and radial wall of the first and second teeth is less than an axial dimension of the radially external tab.

9. The device according to claim 1, comprising solely a first and a second radially external tab inserted diametrically opposed to one another and respectively inserted in a first and a second circumferential recess of the supporting means.

10. The device according to claim 1, wherein the means of centering include first means of bayonet fixing interacting with second means of bayonet fixing mounted on the supporting means for axial securing of the means of centering on the supporting means.

11. An annular combustion chamber in a turbine engine, comprising at least one device according to claim 1.

12. A turbine engine comprising the combustion chamber according to claim 11.

* * * * *